Figure 2:
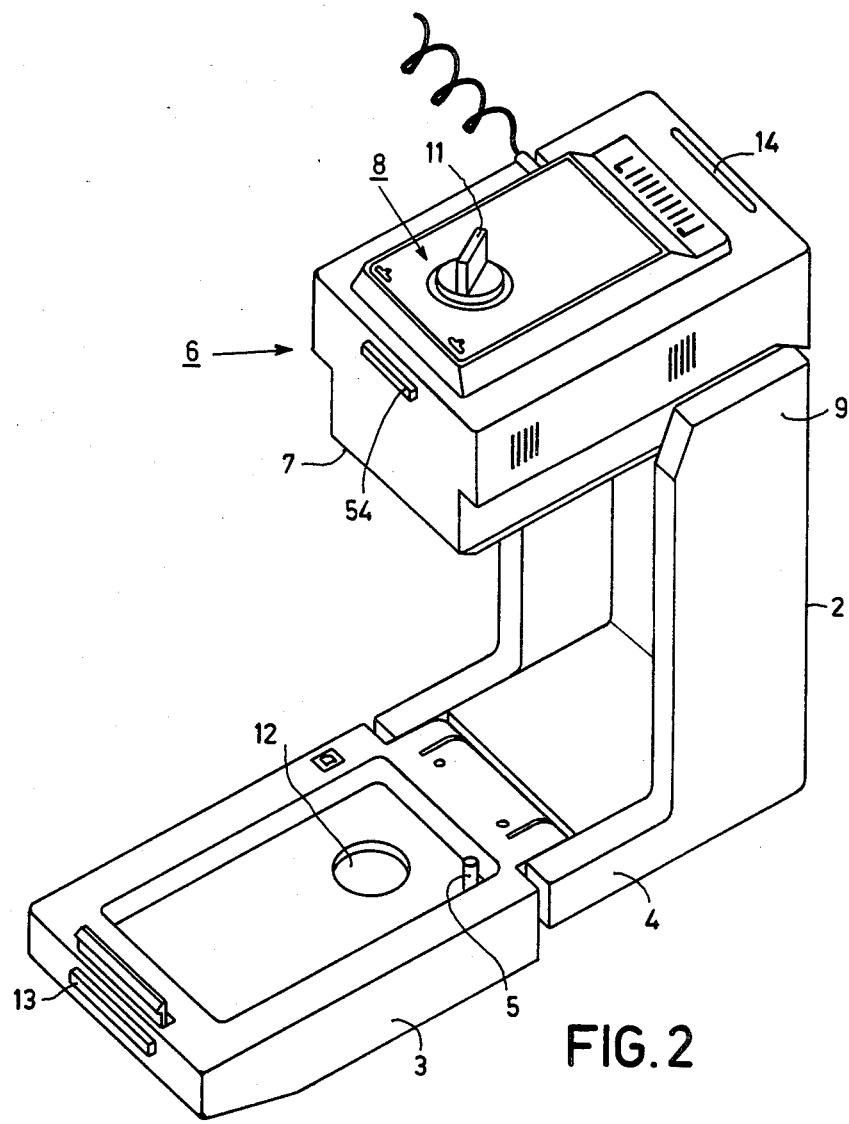

United States Patent [19]

Elkerbout et al.

[11] Patent Number: 4,544,278
[45] Date of Patent: Oct. 1, 1985

[54] KITCHEN MACHINE

[75] Inventors: Marten F. Elkerbout, Groningen; Leonardus P. A. Kloosterhof, Hoogeveen, both of Netherlands

[73] Assignee: U.S. Philips Corporation, New York, N.Y.

[21] Appl. No.: 575,258

[22] Filed: Jan. 30, 1984

[30] Foreign Application Priority Data

Feb. 7, 1983 [NL] Netherlands .................. 8300452

[51] Int. Cl.$^4$ ............................................. A47J 43/08
[52] U.S. Cl. ........................................ 366/129; 74/16; 241/101.1; 366/200; 366/213; 403/17
[58] Field of Search ............... 366/129, 197, 199, 200, 366/208, 213, 222, 349, 601; 241/101.1; 74/16; 99/348; 16/114 R; 403/17

[56] References Cited

U.S. PATENT DOCUMENTS

| | | | |
|---|---|---|---|
| 2,462,089 | 2/1949 | Frisbie | 366/197 |
| 2,789,798 | 4/1957 | Brace | 366/199 |
| 3,224,743 | 12/1965 | Freedman et al. | 366/200 |
| 3,951,351 | 4/1976 | Ernster et al. | 366/200 X |

FOREIGN PATENT DOCUMENTS

| | | | |
|---|---|---|---|
| 1265944 | 4/1968 | Fed. Rep. of Germany | 366/129 |
| 838101 | 6/1981 | U.S.S.R. | 403/17 |

*Primary Examiner*—Philip R. Coe
*Attorney, Agent, or Firm*—Rolf E. Schneider

[57] ABSTRACT

A kitchen machine comprises a U-shaped housing having a base and oppositely disposed, upwardly extending sides. A cover is pivotally connected to one end edge of the base, the cover being rotatable to a position constituting an extension of such base to serve as a support for a bowl. A driving unit includes a housing and a motor unit, the driving-unit housing being rotatably connected to the upper portion of each side of the U-shaped housing; the motor unit having its own housing. A detachable handle is provided for the motor unit. First means is associated with the detachable handle for attaching the handle to the motor unit to enable the motor unit to be arranged in the driving-unit housing and to be removed therefrom. Second means is associated with the motor unit for locking the motor unit in the driving-unit housing.

5 Claims, 7 Drawing Figures

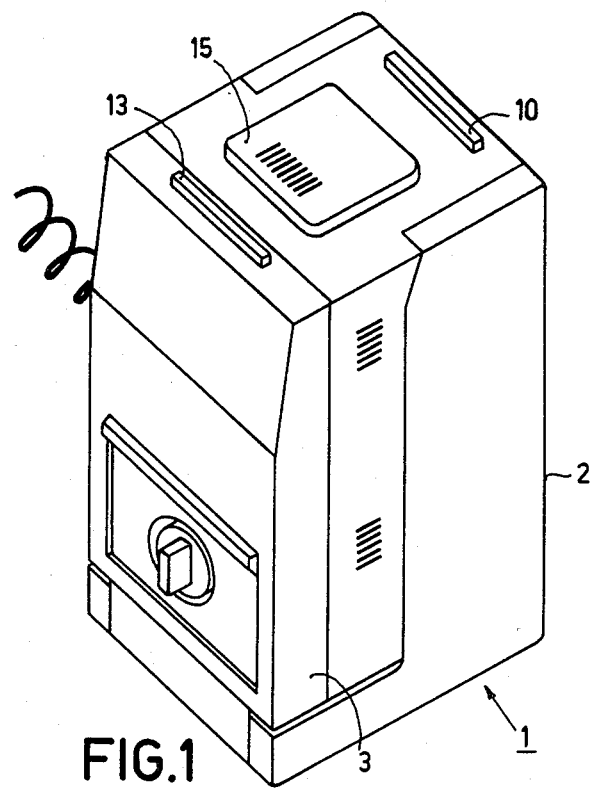
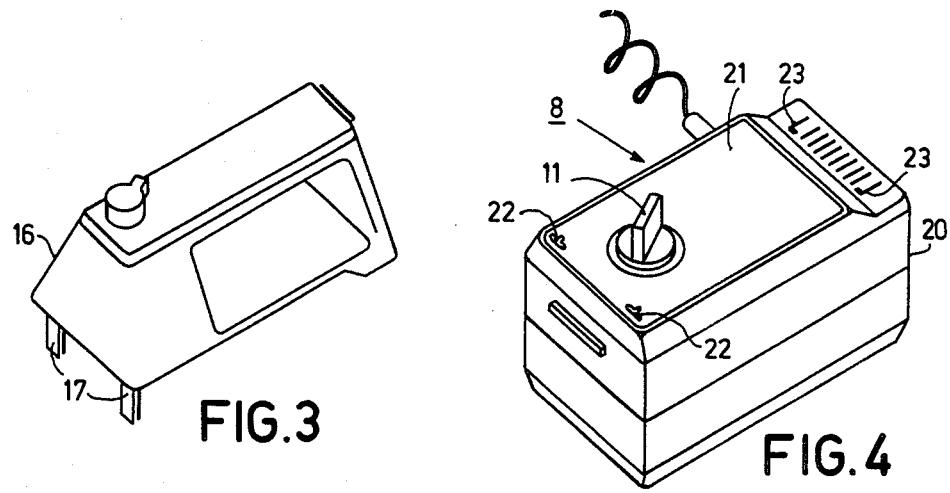

KITCHEN MACHINE

This invention relates to a kitchen machine comprising a pedestal with a U-shaped housing, which is open on the front side, a cover which is rotatably connected to the lower side of the pedestal and serves in the opened condition as a supporting plate for a bowl, and a driving unit rotatably connected to the pedestal.

Such a kitchen machine is known from U.S. Pat. No. 2,789,798. The driving unit in such case is constituted by a hand mixer which can be removed from the pedestal of the kitchen machine in order to be used as a separate hand mixer. In the folded condition, the handle of the hand mixer projects from the housing of the pedestal.

The present invention has for its object to provide an improvement in such a kitchen machine.

For this purpose, the invention is characterized in that the driving unit comprises a housing and a motor unit, which housing is rotatably connected to the open upper side of the pedestal and which motor unit can be arranged and locked in the housing of the driving unit by means of a removable handle for the motor unit. As a result, the kitchen machine is very compact in the folded condition. Moreover, the motor unit can be locked in the housing of the driving unit so that the forces exerted on the motor unit during operation are neutralized.

Figure 5:
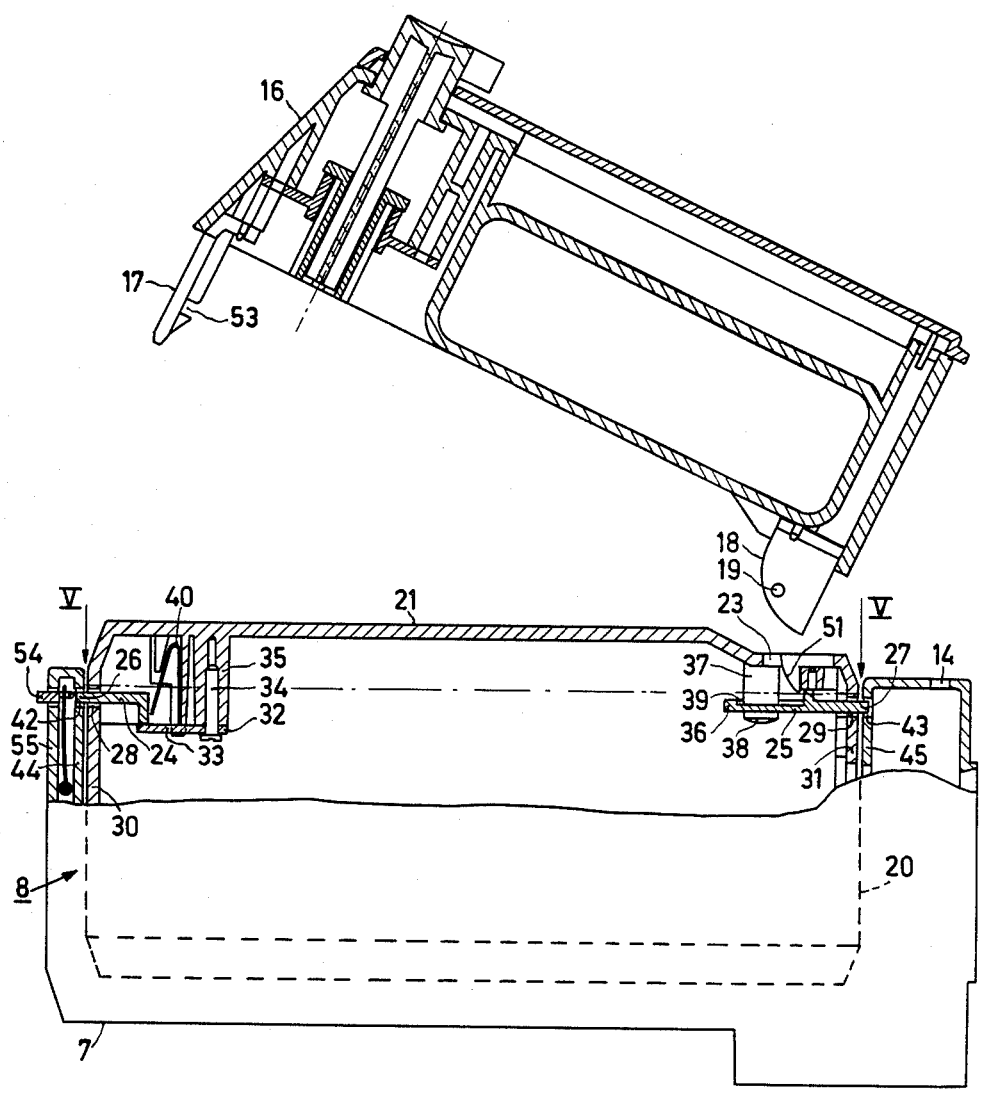
Figure 6:
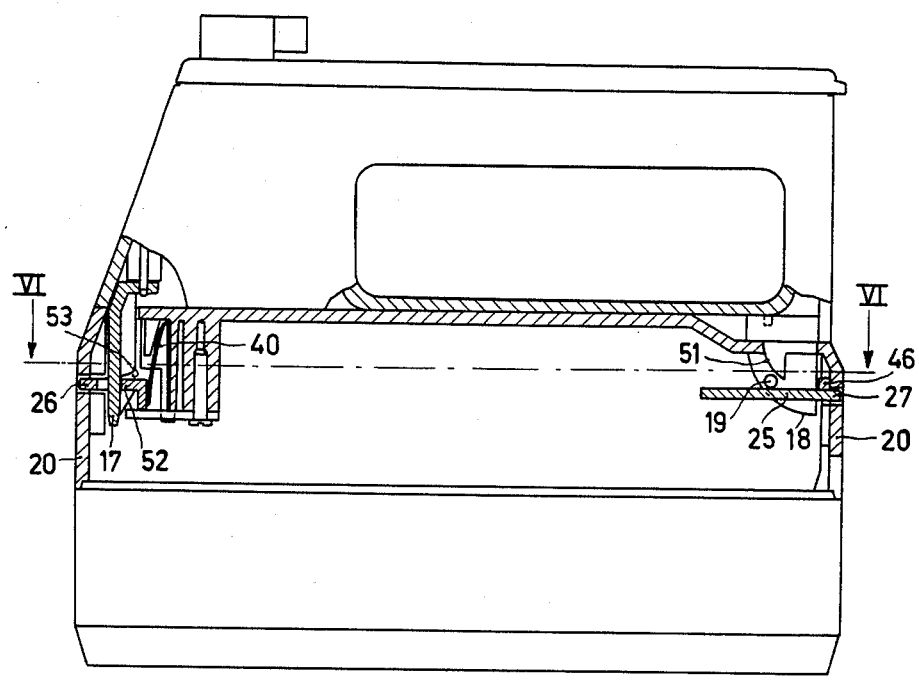
Figure 7:
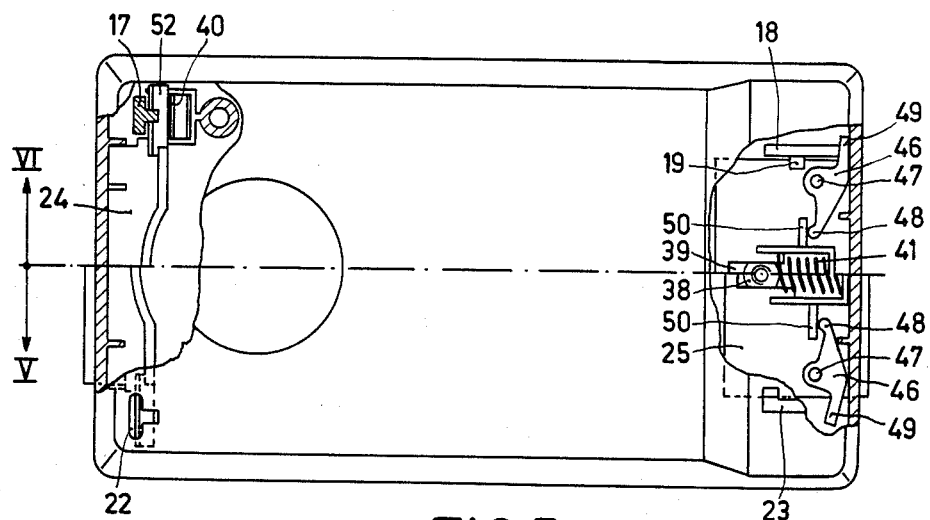

The invention will now be described more fully with reference to the accompanying drawings, in which FIG. 1 is a perspective view of the kitchen machine in folded condition, FIG. 2 is a perspective view of the kitchen machine of FIG. 1 in the unfolded condition, FIG. 3 is a perspective view of the detachable handle of the kitchen machine, FIG. 4 is a perspective view of the removable motor unit of the kitchen machine, FIG. 5 is a partial sectional view on an enlarged scale of the motor unit and the removed handle of the kitchen machine, FIG. 6 is a partial sectional view on an enlarged scale of the motor unit on which the handle is locked, and FIG. 7 is a partial sectional view of the motor unit, partly taken on the line V—V of FIG. 5 and partly taken on the line VI—VI of FIG. 6.

The kitchen machine comprises a pedestal 1 of which the housing 2 is U-shaped and is open on the front side. A cover 3 is rotatably connected to one end edge of the lower side or base 4 of the pedestal. In the opened condition, the cover serves as a supporting plate for a bowl, not shown (FIG. 2). The supporting plate for this purpose has a pin 5 on which the bowl can be arranged and, as the case may be, can be rotated. A driving unit 6 comprises a housing 7 and a motor unit 8. The housing 7 is rotatably connected to the upper portion of each side 9 of the U-shaped housing. The motor unit can be arranged in driving-unit housing. The housing 7 and hence the driving unit 6 can be locked in the horizontal operating position shown in FIG. 2. By depressing a button 10 (FIG. 1), the locking is released and the driving unit can either be rotated into a position directed obliquely upwards for removing or positioning the bowl and agitating tools or can be rotated downwards into a vertical position, after which the supporting plate/cover 3 can be folded upwards so that the compact construction of FIG. 1 is obtained. The speedcontrol button 11 then projects through an opening 12 in the cover 3. By means of an elastic locking button 13 in the cover and an associated slot 14 in the housing 7, the cover can be locked and unlocked on such housing. In the position shown in FIG. 1, the kitchen machine serves to drive a cutting or mixing member of an attachment, such as a blender or a chopper. For this purpose, the cover 15 is removed. Below this cover is located the driving shaft of the motor unit which can be coupled to the shaft for the cutting or mixing member of the attachment.

By means of a handle 6, the motor unit 8 can be removed from the housing 7. For this purpose, the handle is provided on its lower front side ith two downwardly directed locking hooks 17 and on its lower back side with two downwardly directed locking wings 18 which are each provided with a pin 19 directed at right angles thereto. The motor unit 8 comprises a housing 20. The upper surface 21 of this housing is provided with openings 22 and 23 for receiving the locking hooks 17 and the locking wings 18, respectively, of the handle. The means for locking the locking hooks and the locking wings are constituted by springloaded locking slides 24 and 25 which are arranged in the housing 20 so as to be displaceable at right angles to the locking hooks and the locking wings. The outer ends 26 and 27 of the locking slides are passed through openings 28 and 29, respectively, in the side walls 30 and 31, respectively. The other end 32 of the locking slide 24 is supported by a plate 33 which is secured by means of a screw 34 in a screw pile 35 of the housing. The other end 36 of the locking slide 25 is supported by a screw pile 37 with a screw 38. For this purpose, there is provided in the locking slide 25 a slotted hole 39 whose width is slightly smaller than the head of the screw so that the locking slide can slide between the end of the screw pile and the head of the screw.

In FIG. 5, the motor unit 8 is shown located in the housing 7 of the driving unit. Leaf springs 40 and a helical spring 41 (see FIG. 7) in this position urge the locking slides 24 and 25, respectively, through the openings 28 and 29, respectively, into the openings 42 and 43, respectively, in the side walls 44 and 45 of the housing 7. As a result, the motor unit is locked in the housing of the driving unit.

In the housing 20 of the motor unit two tumblers 46 are arranged so as to be rotatable about axes 47 (see FIG. 7). The tumblers each have to ends 48, 49 located substantially diametrically to the axes. The locking slide 25 exerts, due to the helical spring 41 with upright lugs 50 present on the slide, a force on the ends 48 of the tumblers. Further, arcuate guiding lugs 51 are situated near the openings 23.

The locking operates as follows: The handle 16 is moved into an oblique position with respect to the motor unit 8 (FIG. 5), after which the locking wings 18 are passed into the openings 23. The pins 19 then slide along the guiding lugs 51. Subsequently, the handle is rotated into a more horizontal position so that the locking hooks 17 can be passed through the openings 22. When the handle is now pressed onto the motor unit, the locking slide 24 will be moved in a clockwise direction by the locking hooks against the spring force of the leaf springs 40 until an edge 52 of the locking slide falls into recesses 53 of the locking hooks. At the same time, the locking wings 18 exert a force on the ends 49 of the tumblers 46, as a result of which the later are set into rotation and the locking slide 25 is moved in a counterclockwise direction. Since the pins 19 are now located below the arcuate grinding lugs 51, the handle is also locked on its back-side unto the housing of the motor unit. In this position (FIG. 6), the ends 26 and 27 of the locking slides are situated entirely inside the housing 20. The motor unit 8 can now be lifted out of the housing 7 so that in this manner a hand mixer is obtained that can be used separately (FIG. 6).

When the motor is arranged again in the housing 7, the locking between the locking hook 17 and the locking slide 24 can be released by depressing a button 54 which is slidably arranged in a side wall 55 of the housing 7 and is in line with the locking slide 24. When this locking has been released, the handle 16 on the front side can be rotated upwards, after which the locking wings 18 with pins 19 on the back side are also released and can be lifted out of the openings 23.

What is claimed is:

1. A kitchen machine which comprises a U-shaped housing having a base and oppositely disposed, upwardly extending sides; a cover pivotally connected to one end edge of the base, said cover being rotatable to a position constituting an extension of said base to serve as a support for a bowl; a driving unit including a housing and a motor unit, said driving-unit housing being rotatably connected to the upper portion of each side of the U-shaped housing, said motor unit having its own housing; a detachable handle for the motor unit; first means associated with the detachable handle for attaching said handle to the motor unit to enable the motor unit to be arranged in the driving-unit housing and to be removed therefrom; and second means associated with the motor unit for locking the motor unit in the driving-unit housing.

2. A kitchen machine according to claim 1, in which the first means includes a pair of downwardly directed locking hooks to one end of the handle, a pair of downwardly directed locking wings on the other end of the handle, a pin extending perpendicularly from each locking wing, and mechanism in the motor unit for receiving, locking and unlocking the locking hooks and the locking wings of the handle.

3. A kitchen machine according to claim 2, in which the motor-unit housing has an upper surface; and the receiving, locking and unlocking mechanism includes openings in said upper surface for respectively receiving the locking hooks and the locking wings, spring-loaded locking slides inside the motor-unit housing for respectively locking the locking hooks and the locking wings, and guiding lugs inside the motor-unit housing for respectively engaging the pins on the locking wings.

4. A kitchen machine according to claim 3, in which each locking wing influences its associated locking slide by means of a tumbler.

5. A kitchen machine according to claim 3, in which the outer ends of the respective locking slides are displaceable through corresponding slots in the motor-unit housing side walls, and in which the driving-unit housing side walls are also formed with slots in line with the corresponding slots in the motor-unit housing so that, when the handle is removed with the motor unit arranged in the driving-unit housing, the locked slides are passed under the influence of the springs both through the side walls of the motor-unit housing and through the side walls of the driving-unit housing in order to lock the motor unit in the driving-unit housing.

* * * * *